United States Patent

[11] 3,618,560

[72] Inventor Masatsugu Aoki
Tokyo, Japan
[21] Appl. No. 38,970
[22] Filed May 20, 1970
[45] Patented Nov. 9, 1971
[73] Assignee Alps Electric Co., Ltd.
Tokyo, Japan
[32] Priority May 29, 1969
[33] Japan
[31] 44/49802

[54] SWITCH/INDICATOR ACTUATOR ASSEMBLY
12 Claims, 4 Drawing Figs.

[52] U.S. Cl. ........................................................ 116/124.1,
74/96, 116/124, 116/129, 200/172, 324/115, 325/464, 334/86
[51] Int. Cl. ........................................................ H03j 1/02
[50] Field of Search ........................................... 116/124.1, 124.3, 124.2, 124.6, 133, 130, 134; 324/115; 325/455, 464, 465; 235/118; 334/50, 86, 87; 200/172 A, 153.17; 74/89, 96, 10.41, 10, 10.9

[56] References Cited

UNITED STATES PATENTS

| | | | |
|---|---|---|---|
| 1,923,759 | 8/1933 | Smith | 116/124 UX |
| 2,624,835 | 1/1953 | Lear | 334/87 X |
| 2,639,356 | 5/1953 | Savage | 200/172 |
| 2,765,383 | 10/1956 | Cooper et al. | 200/172 |
| 3,192,779 | 7/1965 | Smith | 74/10 |
| 3,209,257 | 9/1965 | Miller | 324/115 |
| 3,525,828 | 8/1970 | Eckhart et al. | 200/172 X |

*Primary Examiner*—Louis J. Capozi
*Attorney*—James and Franklin

ABSTRACT: An actuator for a switch and/or indicator comprises a shaft rotatably passing through a wall and having a flexible nodal switching arm attached thereto, the shaft being operatively connected to a switch and/or indicator or the like. The wall through which the shaft passes is provided with a plurality of spaced nodes projecting therefrom into the path of movement of the nodal switching arm past which said nodal arm can move as a result of the bending of said arm, and is further provided with stop members engageable with said arm beyond said nodes. The construction is exceptionally well adapted for use in a multiband tuning device provided with a tuning shaft, the shaft of this assembly being rotatably mounted on the tuning shaft and being operatively connected both to a band-selection switch and to an indicator.

INVENTOR
MASATSUGU AOKI
BY James and Franklin
ATTORNEY

SWITCH/INDICATOR ACTUATOR ASSEMBLY

This invention relates to an actuator assembly designed to be used in conjunction with a switch and/or a movable indicator, and is particularly well adapted for use in conjunction with the actuation of a band selection switch in a communications receiver.

The channels for television reception may be grouped into several distinct bands, such as the low and high frequency bands for VHF reception and the band for UHF reception. Within each band several channels are available. It is desirable that means be provided for selecting the desired band and then for selecting the desired channel within that band. To that end means must be provided for making the appropriate electrical connections within the receiver to select the desired band, for making the appropriate adjustments for selecting the desired channel within the selected band, and for providing an indication to the user of the equipment as to the tuning status thereof. From a practical point of view it is essential that these functions be carried out in as simple a manner as possible, so that the user of the equipment can quickly and accurately accomplish the tuning operation. Further from a practical point of view it is essential that these results be accomplished by mechanism which is sturdy, simple and as inexpensive as possible consistent with proper operation.

When an electrical band selection switch, or something comparable thereto, is employed for band selection it is necessary that the switch actuator be accurately retained in its various operative positions yet be readily movable from one to the other. In the past this has been accomplished by special detenting apparatus which adds significantly to the cost of the equipment. The manually actuated member must be connected not only to the switch or other element which it is to control but also to the tuning indicator, and this too has in the past involved the use of apparatus of a significant degree of complexity, which also added appreciably to the cost of the equipment.

It is an object of the present invention to provide an actuator for a switch and/or indicator, and preferably both, which is detent-retained in its various operative positions by means of a simple, inexpensive and reliable structure.

It is a further object of the present invention to provide a simple structure which may be directly connected to an indicator so as to actuate the latter while at the same time actuating band switching or selecting means.

It is another object of the present invention to devise such an actuator which may readily be associated with a tuning shaft for a television tuner or the like, thereby to facilitate the accomplishment of band selection and channel selection by the user of the equipment.

To these ends the actuator comprises a shaft which rotatably passes through a wall, that shaft being provided with a flexible nodal arm extending therefrom adjacent the wall. A plurality of spaced nodes project from the wall into the path of movement of the nodal arm past which the nodal arm can move while resiliently bending. The cooperation between the nodes and the nodal arm provide for detenting of the actuator into its various operative positions. The wall is also provided with stop members extending into the path of movement of the nodal arm beyond the nodes, thereby to prevent the actuator from being moved beyond its operative range. The actuator may be operatively connected to a band selection switch or other element to be actuated, and it also is operatively connected to a movable indicator which, in the case of band selection for a television tuner or the like, indicates at a display station the particular channels within the band selected through rotation of the actuator. Channel selection within the band may be accomplished by an adjacently positioned tuning shaft, on which the actuator shaft preferably is coaxially rotatably mounted.

To the accomplishment of the above, and to such other objects as may hereinafter appear, the present invention relates to the construction of an actuator assembly as defined in the appended claims and as described in this specification, taken together with the accompanying drawings, in which:

The drawings illustrate the present invention embodied in an apparatus provided with a plurality of assemblies each adapted to be preconditioned for the tuning of a different television channel, one or another of those assemblies subsequently being individually selected for operative tuning by any suitable mechanism, such as pushbutton control. Accordingly, a plurality of actuator assemblies, each provided with its own indicator, are disclosed in the apparatus in question. They are all similarly constructed, and hence a description of one will suffice for all.

A housing 1 is provided within or on which suitable tuning circuitry and apparatus is provided. The precise nature of that apparatus forms no part of the present invention, may take any desirable form, and consequently is not here illustrated. Tuning or preadjustment for subsequent tuning operation is accomplished by means of a rotary shaft 2 which extends through the front wall 6 of the housing. Rotation of the shaft 2 is effective to select, or to precondition for subsequently selecting, a particular channel within a band of channels. Means are also provided within the tuning apparatus (not specifically shown) for selecting, or preconditioning for subsequently selecting, a particular band of channels within which the shaft 2 may be operative for channel selection.

Figure 1:
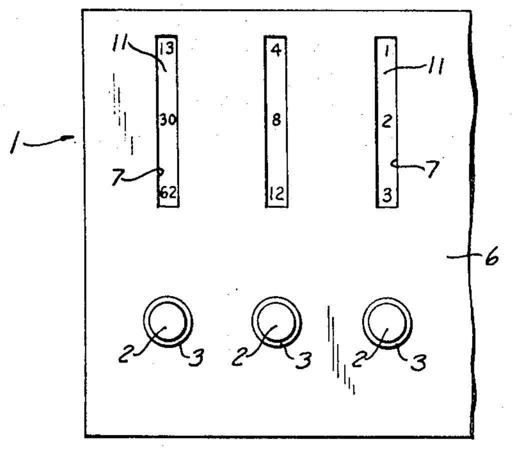
FIG. 1 is a fragmentary front elevational view of a tuner embodying a plurality of the actuator assemblies of the present invention.
Figure 2:
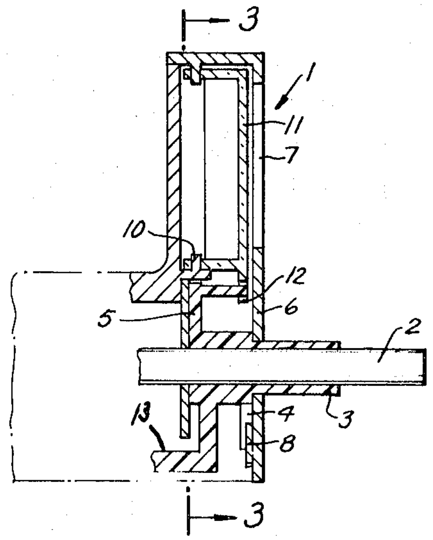
FIG. 2 is a cross-sectional view taken along the line 2—2 of FIG. 3.
Figure 3:
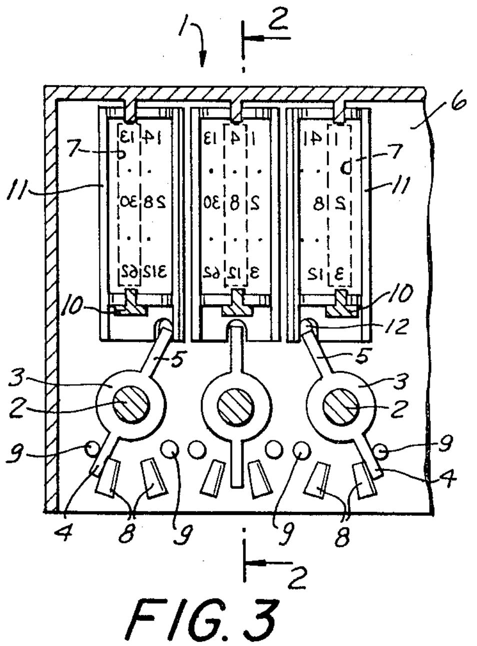
FIG. 3 is a cross-sectional view taken along the line 3—3 of FIG. 2.
Figure 4:
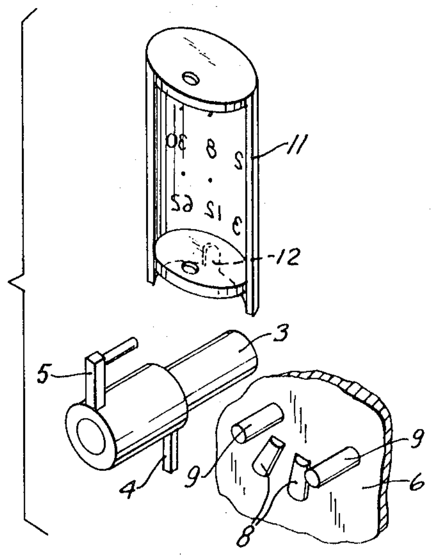
FIG. 4 is a three-quarter perspective exploded view of the actuator assembly and display member.

Band selection is accomplished by means of the actuator assembly of the present invention, which comprises a hollow shaft 3 rotatably mounted on the shaft 2 and also passing through the wall 6 of the housing 1. Extending from the shaft 3 inside the housing 1 is a part 13 which extends into the housing 1 and is adapted to perform the band-switching, preselecting or other function desired. A flexible nodal switching arm 4 is integrally formed with the shaft 3 and extends radially outwardly therefrom adjacent the inner surface of the housing wall 6. As may best be seen from FIGS. 3 and 4, the inner surface of the housing wall 6 is provided with a plurality of nodes 8 projecting inwardly therefrom and preferably formed integrally therewith, as in a molding or stamping operation, those nodes 8 extending into the path of movement of the nodal arm 4. Also extending inwardly from the housing wall 6 are a pair of stops 8 also located in the path of movement of the nodal arm 4 but beyond the nodes 8. As shown, there are two spaced nodes 8, and beyond them on either side the stops 9, thus defining three arm-receiving spaces therebetween. The nodes 8 are so sized and shaped that as the actuator shaft 3 is rotated the arm 4 can flex and ride over the node 8, then snapping into the next adjacent arm-receiving space. The stops 9, however, when engaged by the nodal arm 4, act as positive stops preventing that arm from moving any further.

The housing further comprises support walls 10 on which the display members 11 are mounted, the supports 10 and the top wall of the housing 1 having projections received within appropriately positioned openings in horizontal walls of the display member 11, thereby to mount that member for pivotal movement about a vertical axis. The vertical wall of the display member 11 is provided with three vertically extending rows of indicia representing, for example, the channels available in the three different bands to which the receiver may be tuned, and a given one of those rows of indicia is rendered visible through an indicating window 7 in the front wall 6 of the housing depending upon the pivoted position of the display member 11. That display member 11 is moved to the desired one of its operative display positions, thereby to exhibit the appropriate row of indicia through the window 7, by being connected to the actuator shaft 3. To this end the shaft 3 is provided with an upwardly and rearwardly extending element 5, the end of which is received in an opening 12 formed in a wall portion of the display member 11 which extends below the lower horizontal wall thereof.

The tuning shaft 2 may have an index member connected thereto movable vertically along the window 7 so as to indicate the rotative position of the shaft 2 and hence the particular channel within the selected band which actuation of the tuning shaft 2 has rendered operative for reception. This indicator, and its operative connection to the shaft 2, form no part of the present invention, may be accomplished by any suitable mechanism, of which many are known, and hence is not here specifically illustrated.

When the shaft 3 is rotated it will be detent-retained in its desired operative position by cooperation between the flexible nodal arm 4 and the nodes 8 and/or stops 9. It may be moved from one operative position to another by causing the nodal arm 4 to pass over one or another of the nodes 8, the arm 4 bending to permit this movement. Since the arm 4 may be integrally formed with the shaft 4 and the nodes 8 may be integrally formed with the wall 6, this movement-control and positioning will be seen to be accomplished in a very simple, inexpensive, yet positive and reliable manner. Movement of the shaft 3 causes actuation of the band selector through the part 13 and appropriately positions the display member 11 through the part 5. Thereafter selection of the particular channel desired within the selected band is accomplished through rotation of the tuning shaft 2. The display member 12 is positively connected to the actuator, and hence the possibility of error in display or indication is virtually eliminated.

While the present invention has been illustrated as embodied in a television tuner designed for band selection and for channel selection within a given band, it will be apparent that the present invention is not limited to use in that particular environment, but is of wide applicability. Moreover, although but a single embodiment of the present invention has been here specifically disclosed, it will be apparent that many variations may be made therein, all within the scope of the invention as defined in the following claims.

I claim:

1. In combination with a tuning shaft mounted in a housing having a wall with a display window, said tuning shaft passing through said wall, and a display member mounted on said housing so as to be movable between a plurality of operative positions relative to said window, thereby to display different portions thereof through said window; an actuator comprising a hollow shaft rotatable with and mounted on said tuning shaft, an element extending therefrom and operatively connected to said display member for moving the latter in response to rotation of the former, and a flexible nodal arm extending from said hollow shaft adjacent said wall, a plurality of spaced nodes projecting from said wall into the path of movement of said nodal arm past which said nodal arm can move as a result of the bending of said arm, and stop members extending from said wall into the path of movement of said nodal arm beyond said nodes.

2. The combination of claim 1, in which said display member has an opening therein, said element comprising a part received in said opening.

3. The combination of claim 2, in which said display member is mounted above said hollow shaft for pivotal movement about an axis substantially perpendicular to the axis of said hollow shaft.

4. The combination of claim 2, in which said display member is mounted above said hollow shaft for pivotal movement about an axis substantially perpendicular to the axis of said hollow shaft, said opening being formed in a part of said display member depending from said member proper.

5. In combination with a tuning shaft mounted in a housing having a wall, said tuning shaft passing through said wall, a display member mounted on said housing so as to be movable between a plurality of operative positions, an actuator comprising a hollow shaft rotatable with and mounted on said tuning shaft, an element extending therefrom and operatively connected to said display member for moving the latter in responsive to rotation of the former, and a flexible nodal arm extending from said hollow shaft adjacent said wall, a plurality of spaced nodes projecting from said wall into the path of movement of said nodal arm past which said nodal arm can move as a result of the bending of said arm, and stop members extending from said wall into the path of movement of said nodal arm beyond said nodes.

6. The combination of claim 5, in which said display member has an opening therein, said element comprising a part received in said opening.

7. The combination of claim 6, in which said display member is mounted above said hollow shaft for pivotal movement about an axis substantially perpendicular to the axis of said hollow shaft.

8. The combination of claim 6, in which said display member is mounted above said hollow shaft for pivotal movement about an axis substantially perpendicular to the axis of said hollow shaft, said opening being formed in a part of said display member depending from said member proper.

9. An actuator assembly comprising a housing having a wall, a display member mounted on said housing so as to be movable between a plurality of operative positions, and an actuator comprising a hollow shaft rotatably passing through said wall, an element extending therefrom and operatively connected to said display member for moving the latter in response to rotation of the former, and a flexible nodal arm extending from said hollow shaft adjacent said wall, a plurality of spaced nodes projecting from said wall into the path of movement of said nodal arm past which said nodal arm can move as a result of the bending of said arm, and stop members extending from said wall into the path of movement of said nodal arm beyond said nodes.

10. The combination of claim 9, in which said display member has an opening therein, said element comprising a part received in said opening.

11. The combination of claim 10, in which said display member is mounted above said shaft for pivotal movement about an axis substantially perpendicular to the axis of said hollow shaft.

12. The combination of claim 10, in which said display member is mounted above said hollow shaft for pivotal movement about an axis substantially perpendicular to the axis of said hollow shaft, said opening being formed in a part of said display member depending from said member proper.

* * * * *